(12) United States Patent
Peterson et al.

(10) Patent No.: US 6,734,865 B1
(45) Date of Patent: May 11, 2004

(54) METHOD AND SYSTEM FOR MAPPING VARIOUS LENGTH DATA REGIONS

(75) Inventors: James R. Peterson, Portland, OR (US); William Radke, San Francisco, CA (US)

(73) Assignee: Micron Technology, Inc., Boise, ID (US)

( * ) Notice: Subject to any disclaimer, the term of this patent is extended or adjusted under 35 U.S.C. 154(b) by 383 days.

(21) Appl. No.: 09/737,232

(22) Filed: Dec. 13, 2000

(51) Int. Cl.$^7$ .............................................. G06F 12/02
(52) U.S. Cl. ...................... 345/544; 345/546; 345/605; 345/565
(58) Field of Search .............................. 345/544, 531, 345/546, 686, 547, 605, 565

(56) References Cited

U.S. PATENT DOCUMENTS

| | | | |
|---|---|---|---|
| 4,507,730 A | | 3/1985 | Johnson et al. ............. 364/200 |
| 5,241,658 A | * | 8/1993 | Masterson et al. |
| 5,357,621 A | | 10/1994 | Cox ............................ 395/400 |
| 5,469,190 A | * | 11/1995 | Masterson |
| 5,724,560 A | * | 3/1998 | Johns et al. |
| 6,252,612 B1 | | 6/2001 | Jeddeloh ..................... 345/521 |

* cited by examiner

Primary Examiner—Matthew C. Bella
Assistant Examiner—Hau Nguyen
(74) Attorney, Agent, or Firm—Dorsey & Whitney LLP

(57) ABSTRACT

A system and method for storing data in memory in either a packed or unpacked format contiguously and providing retrieved data in an unpacked format. The memory system includes a memory having packed and unpacked data stored in lines of data and a register to store a line of data it receives from the memory. Further included in the system is a selection circuit coupled to receive data from both the memory and the register. The selection circuit selects a portion of data from the lines of data presented to it by the memory and the register to be provided to a data bus according to a select signal provided by a memory address generator. The select signal is calculated by the memory address generator from an expected address at which the data is expected to be located. A second register and a second selection circuit may also be included in the memory system. The second register is coupled to the data bus to receive a line of data and the second selection circuit is coupled to both the second register and the data bus to receive a line of data from each. The selection circuit is further coupled to the memory, to which the selection circuit provides a data that is selected from the lines of data presented to it by the second register and the data bus.

11 Claims, 4 Drawing Sheets

METHOD AND SYSTEM FOR MAPPING VARIOUS LENGTH DATA REGIONS

TECHNICAL FIELD

The present invention is related generally to the field of computer graphics, and more particularly, to a system and method for storing graphics data in a computer graphics processing system.

BACKGROUND OF THE INVENTION

As with any computer processing intensive system, computer graphics processing systems have a need to store and retrieve data quickly and efficiently. Typical graphics data include vertex information, color values, pixel coordinates, lighting conditions, and the like. Large amounts of graphics data are processed in producing realistic graphics images. As graphics images become more realistic and detailed, more graphics data must be processed in producing those computer graphics images. Moreover, in graphics applications where graphics images must be refreshed quickly, such as computer animation, retrieving and processing graphics data must occur fast enough for the animation sequences to appear smooth and continuous. Consequently, not only is more memory needed, but being able to quickly access data from memory is necessary as well.

Various hardware and software methods have been developed to address the memory and memory access issues previously described. Including more memory in a graphics processing system is one means of addressing the problems. However, this does not necessarily resolve the issue of high-speed access to the data stored by the memory. Another approach has been to embed a portion of memory in a graphics processing device. That is, a limited amount of memory is included on the same semiconductor substrate on which the graphics processing device is fabricated. The memory is specifically designated to store graphics data for processing, and its proximity to the rest of the graphics processing device decreases the time to retrieve the data. However, embedding memory with the graphics processing device is relatively costly, and so the amount of memory that is typically embedded in a system is limited.

As the limits of current technology on the amount of embedded memory that may be included in a system and the access speed of memory are approached, another method developed to resolve the memory demands of graphics processing systems is to store the graphics data in memory in a more efficient manner. That is, the graphics data is stored in a manner that either reduces the amount, and thus reduces the need for additional memory, or stores the graphics data in a format that is conducive to fast access. One such common method of reducing the amount of graphics data is through compression. One type of graphics data compression is accomplished by truncating or ignoring a portion of the graphics data representing a pixel during storage or retrieval. Although the precision of the graphics data is reduced by the data compression, the amount of compression selected is such that an acceptable level of resolution is maintained for the graphics image.

The benefit of compressing graphics data is that the amount of data required to be processed and stored is reduced. However, a graphics system is typically designed to either compress the graphics data or not. That is, a system which benefits from compressing data typically must compress all graphics data, and is precluded from storing and retrieving graphics data in an uncompressed format. Thus, compressed data and uncompressed data cannot be stored contiguously in a memory space in these systems. Consequently, in situations where compression is not needed, or maintaining the precision of the graphics data is desired, compressing the graphics data may be disadvantageous. Unfortunately, conventional graphics processing systems lack the flexibility to store graphics data in multiple data formats.

Therefore, there is a need for a graphics processing system having the flexibility to store graphics data in various data formats.

SUMMARY OF THE INVENTION

The present invention is directed to a system and method for storing data in memory in either a packed or unpacked format contiguously. The data is stored in either the packed or unpacked format and is provided in an unpacked format when retrieved from memory. The memory system includes a memory having packed and unpacked data stored in lines of data, a register to store a line of data it receives from the memory, and a selection circuit coupled to the memory and the register to receive a line of data from each. The selection circuit selects a portion of data from the lines of data presented to it by the memory and the register to be provided to a data bus. The selection circuit may be directed to select portions of data according to a select signal provided by a memory address generator. The memory address generator calculates the select signal from an expected address at which the data is expected to be located. A second register and a second selection circuit may also be included in the memory system. The second register is coupled to the data bus to receive a line of data and the second selection circuit is coupled to both the second register and the data bus to receive a line of data from each. The selection circuit is further coupled to the memory, to which the selection circuit provides a data that is selected from the lines of data presented to it by the second register and the data bus.

DETAILED DESCRIPTION OF THE INVENTION

Embodiments of the present invention provide a memory system and method that allows graphics data in either a packed or unpacked format to be stored contiguously in a memory space. Data is stored and retrieved according to the format in which the data is stored. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
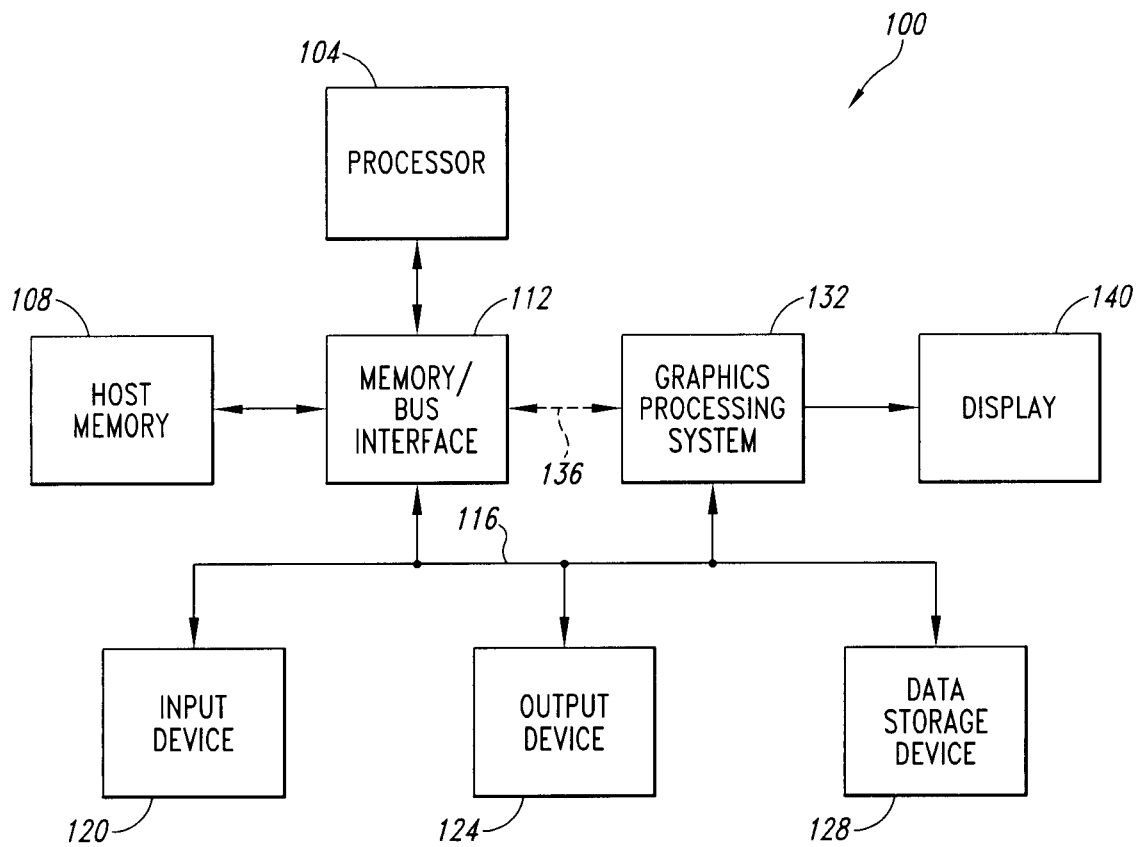
FIG. 1 is a block diagram of a computer system in which an embodiment of the present invention is implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to and from the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
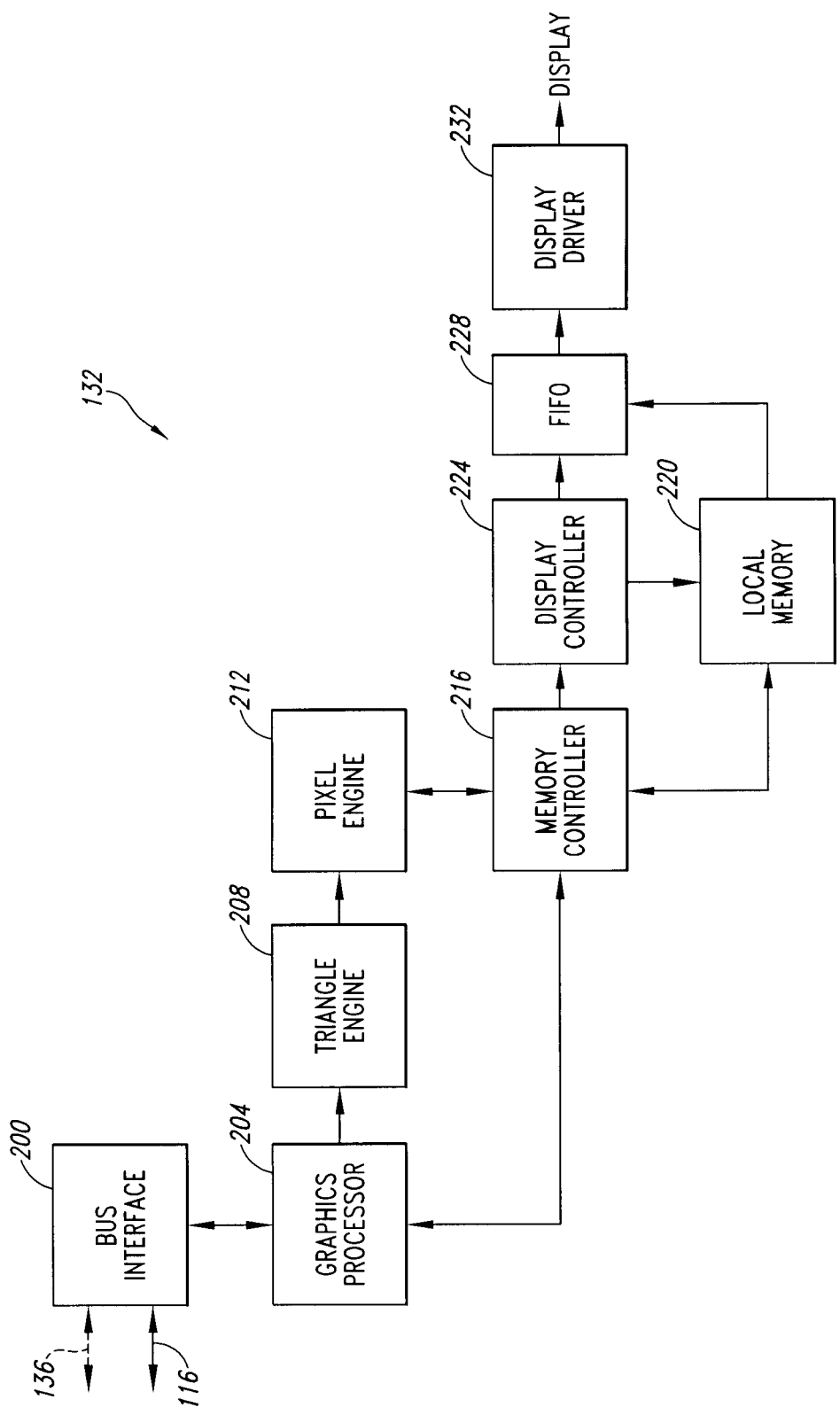
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, rendering of graphics primitives, and generating texture coordinates for a texture map. A pixel engine 212 is coupled to receive the graphics data generated by the triangle engine 208. The pixel engine 212 contains circuitry for performing various graphics functions, such as, but not limited to, texture application or mapping, bilinear filtering, fog, blending, and color space conversion.

A memory controller 216 coupled to the pixel engine 212 and the graphics processor 204 handles memory requests to and from a local memory 220. The local memory 220 stores graphics data, such as source pixel color values and destination pixel color values. A display controller 224 coupled to the local memory 220 and to a first-in first-out (FIFO) buffer 228 controls the transfer of destination color values to the FIFO 228. Destination color values stored in the FIFO 228 are provided to a display driver 232 that includes circuitry to provide digital color signals, or convert digital color signals to red, green, and blue analog color signals, to drive the display 140 (FIG. 1).

Figure 3:
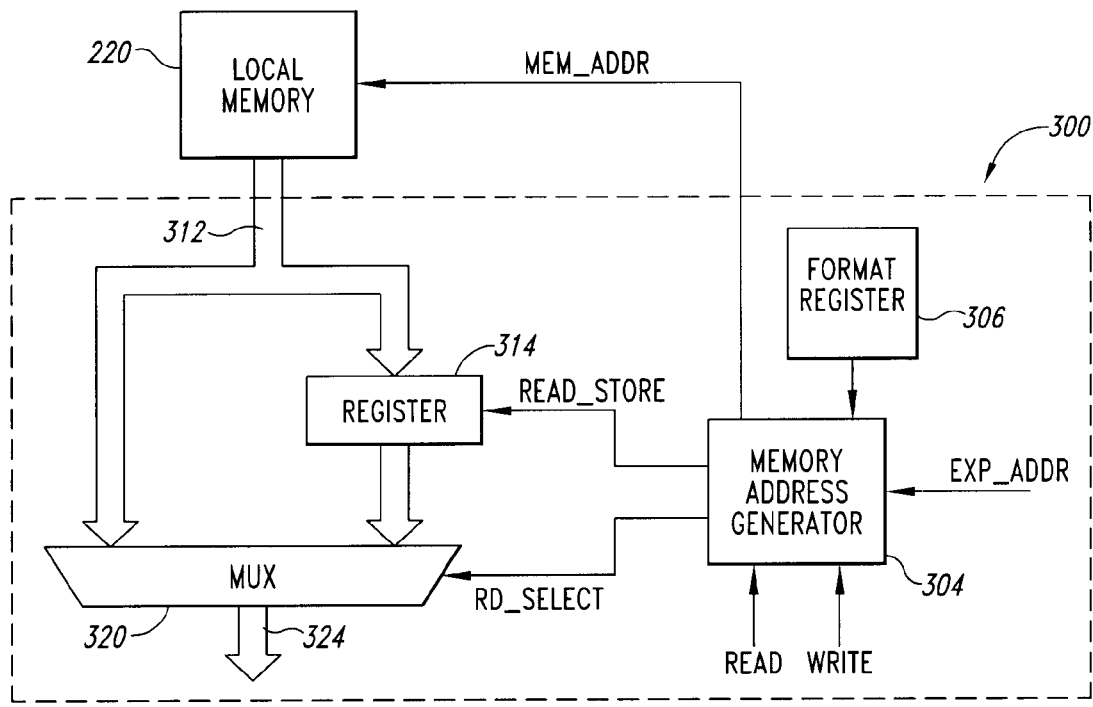
FIG. 3 is a block diagram of a portion of a read datapath for a memory controller according to an embodiment of the present invention.

FIG. 3 illustrates a portion of a read datapath 300 for a memory controller that may be substituted into the memory controller 216 (FIG. 2). A memory address generator 304 receives from a requesting entity, such as the graphics processor 204 or the pixel engine 212, a read command and an expected address EXP_ADDR at which the data may be accessed. The memory address generator 304 queries a format register 306 to determine whether the requested data is stored in a packed or unpacked format in the local memory 220. An unpacked format indicates that the data is stored unaltered, while a packed format indicates that the data has been compressed in some manner. In both the packed and unpacked format, the local memory 220 stores data in lines of data which are provided from the local memory 220 on a memory read bus 312 to both a register 314 and a multiplexer 320. The memory address generator 304 is coupled to the register 314 and provides it a READ_STORE signal that strobes the register 314 to store the data present on the memory read bus 312. The memory address generator 304 also provides a RD_SELECT signal to the multiplexer 320 to select which of the data it receives from the memory read bus 312 and the register 314 to provide on a data output bus 324.

An example of a packed data format that may be used in embodiments of the present invention packs a 32-bit word of graphics data (i.e., 4 bytes per pixel) into a 24-bit packed format (i.e., 3 bytes per pixel) by truncating the most significant byte of each word. The data is stored in the local memory 220 in lines of data 16-bytes in length (i.e., bytes [15:0]). When storing unpacked data in these lines of data, the data is stored in the following format in memory:

Line [0], bytes [15:00]=ddddccccbbbbaaaA
Line [1], bytes [31:16]=hhhhggggffffeeeE
Line [2], bytes [47:32]=llllkkkkjjjjiiiI
Line [3], bytes [64:48]=ppppooonnnnmmmM where each letter represents an 8-bit byte, and each of the capital letters (i.e., A, E, I, and M) represents the first byte of a line of data. As illustrated, four lines of data are required to store 16 words of data in an unpacked format. In contrast, packed graphics data stored in memory in 16-byte lines appears as:

Line [0], bytes [15:00]=feeEdddccccbbbaaaA
Line [1], bytes [31:16]=kkjjjiiIhhhggggff
Line [2], bytes [47:32]=pppooonnnmmMlllk Note that in the case of the packed data, the most significant byte of each word has been ignored, and as a result, the data for 16 words of data may be written into only three lines of data. As will be explained in more detail below, when packed data are read from the local memory 220, null values are inserted before providing the data to the requesting entity. In an embodiment of the present invention, the null values are inserted by the multiplexer 320. Further note that a line of data may be spread across two different lines and that the first byte of a line of data is located in one of four positions: (1) byte "A" is positioned at the first byte; (2) byte "E" is positioned at the thirteenth byte; (3) byte "I" is positioned at the ninth byte; and (4) byte "M" is positioned at the fifth byte.

An example of a multiplexer that can provide the data from the memory read bus 312 and the register 314 to the data output bus 324, as well as insert null values into packed data is described below. Such a multiplexer may be programmed to carry out the following data selections:

| RD_SELECT | 15 | 14 | 13 | 12 | 11 | 10 | 9  | 8  | 7 | 6  | 5  | 4  | 3 | 2  | 1  | 0  |
|-----------|----|----|----|----|----|----|----|----|---|----|----|----|---|----|----|----|
| 0         | 0  | Mb | Ma | M9 | 0  | M8 | M7 | M6 | 0 | M5 | M4 | M3 | 0 | M2 | M1 | M0 |
| 1         | 0  | Mf | Me | Md | 0  | Mc | Mb | Ma | 0 | M9 | M8 | M7 | 0 | M6 | M5 | M4 |
| 2         | 0  | M3 | M2 | M1 | 0  | M0 | Sf | Se | 0 | Sd | Sc | Sb | 0 | Sa | S9 | S8 |
| 3         | 0  | M7 | M6 | M5 | 0  | M4 | M3 | M2 | 0 | M1 | M0 | Sf | 0 | Se | Sd | Sc |
| 4         | 0  | Sf | Se | Sd | 0  | Sc | Sb | Sa | 0 | S9 | S8 | S7 | 0 | S6 | S5 | S4 |
| 5         | 0  | S3 | S2 | S1 | 0  | S0 | Mf | Me | 0 | Md | Mc | Mb | 0 | Ma | M9 | M8 |
| 7         | 0  | Sb | Sa | S9 | 0  | S8 | S7 | S6 | 0 | S5 | S4 | S3 | 0 | S2 | S1 | S0 |
| *         | Mf | Me | Md | Mc | Mb | Ma | M9 | M8 | M7| M6 | M5 | M4 | M3| M2 | M1 | M0 | where Mn represents the nth byte of data from the memory read bus 312 and Sn represents the nth byte of data from the register 314. The RD_SELECT value is provided by the memory address generator 304 and is determined from the EXP_ADDR it receives from a requesting entity. The "*" indicates that the multiplexer 320 should ignore the RD_SELECT signal and pass the data it receives on the memory read bus 312 to the data output bus 324. For selections 0–7, null values are inserted into the upper most byte of each word. The selections described above also provide the ability to select a line of data having a first byte from any of the four positions previously discussed, regardless of the order in which two lines of data are retrieved.

It will be appreciated that a person of ordinary skill in the art will have sufficient understanding of how to practice embodiments of the invention from the description provided herein. Thus, as mentioned previously, detailed description of well-know circuits, control signals, timing protocols, and the like, have been omitted for the purposes of brevity. Moreover, the following description is provided by way of example to further explain the operation of embodiments of the present invention, and should not be interpreted as limiting the scope thereof.

In operation, where the memory controller 300 receives a read command and the format register 306 is set for an unpacked format, the memory address generator 304 provides the expected address EXP_ADDR to the local memory 220 as the memory address MEM_ADDR. Upon receiving the MEM_ADDR, the requested data is accessed, and a line of data including the requested data is provided by the local memory 220 through the memory read bus 312 to the multiplexer 320 and a register 314. Upon receiving the read command, the memory address generator 304 further provides a READ_STORE command to the register 314 instructing it to ignore storing data present on the memory read bus 312. The memory address generator 304 also provides a RD_SELECT signal to the multiplexer 320 to select the portion of the data provided directly by the memory read bus 312. As a result, the multiplexer 320 passes the data present on the memory read bus 312 through to the data output bus 324 unaltered.

In contrast, accessing data that is stored in the packed format is accomplished differently than previously described for the unpacked data. If the format register 306 is set for a packed format, the memory address generator 304 calculates from the EXP_ADDR a MEM_ADDR at which the requested data is actually stored. In this manner, data packing in present embodiments is transparent to an application executing on the computer system 100 (FIG. 1) because address conversion is performed by the memory address generator 304. Consequently, the EXP_ADDR is the address at which the application expects the requested data is stored. However, where the requested data is in a packed format, the data may be actually stored in a location different than the one corresponding to the EXP_ADDR. Thus, the EXP_ADDR is translated by the memory address generator 304 into a MEM_ADDR, that is, the memory address at which the requested data is stored. The MEM_ADDR is provided to the local memory 220, which returns a line of data that includes the requested data to the primary register 314.

As mentioned previously, the requested packed data may be spread across two different lines of data, and so two memory accesses are performed. The data from the first retrieval are provided over the memory read bus 312 to both the register 314 and the multiplexer 320. The register 314 stores the data upon receiving a READ_STORE signal from the memory address generator 304. The data from the second retrieval is also provided on the memory read bus 312 to both the register 314 and multiplexer 320. However, the register 314 is instructed by the memory address generator 304 to ignore the new data and continue to store the data from the first retrieval. Following the second retrieval, the memory address generator 304 provides a RD_SELECT signal to select bytes of data from the second retrieval present at the memory read bus 312 and the data stored in the register 314. Null values are inserted into the most significant bytes of the words and the resulting line of data is provided to the requesting entity on the data output bus 324.

Retrieval of packed data will be illustrated by the following example. A request to read the line of data beginning with byte "E" is received from a requesting entity. As mentioned previously, the packing of data in memory is transparent to the requesting entity, and consequently, the requesting entity has an image of memory similar to that of unpacked data described above. Thus, the EXP_ADDR provided by the requesting entity is for the fifth word (i.e., first byte of the second line of data, or word address=4). However, in a packed arrangement, the line of data beginning with byte "E" actually begins at the thirteenth byte of the first line of data and extends to the eighth byte of the second line of data. That is, providing the requested data requires that both line [0] and line [1] are retrieved from the local memory 220.

The memory address generator 304 receives the memory request to the fifth word, and checks the format register 306 to determine that the data is in the packed format. The EXP_ADDR it receives from the requesting entity is used to calculate the MEM_ADDR at which the requested line of data is actually stored, that is, addresses for both lines [0] and [1] are provided to the local memory 220. The memory address generator 304 further sends an activate READ_STORE signal to the register 314 to store the data of line [0] when it becomes available on the memory read bus 312. After the data of line [0] becomes available and is stored by the register 314, the data of line [1] is retrieved and provided over the memory bus 320. At this point, the memory address generator 304 calculates an appropriate RD_SELECT signal for the multiplexer to choose which bytes of data to provide to the requesting entity. A suitable RD_SELECT value may be calculated from the following equation:

RD_SELECT=[(EXP_ADDR$_{word\ address}$)÷4]×3 where the EXP_ADDR$_{word\ address}$ is the word address provided by the requesting entity.

RD_SELECT=[(4)÷4]×3=3.

The resulting RD_SELECT value is provided to the multiplexer 320 and the bytes of the of data beginning with byte "E" are selected, null values are inserted, and the resulting line of data is passed onto the data output bus 324. Namely, the resulting line of data that is provided is:

| 0 | M7 | M6 | M5 | 0 | M4 | M3 | M2 | 0 | M1 | M0 | Sf | 0 | Se | Sd | Sc |
|---|----|----|----|----|----|----|----|----|----|----|----|----|----|----|----|
| 0 | h  | h  | h  | 0 | g  | g  | g  | 0 | f  | f  | f  | 0 | e  | e  | E  | where Sc is the thirteenth byte of the line of data stored in the register 314 (i.e., byte "E" of line [0]) and M7 is the eighth byte of the second line of data retrieved and present on the memory read bus 312 (i.e., byte "h" of line [1]).

Figure 4:
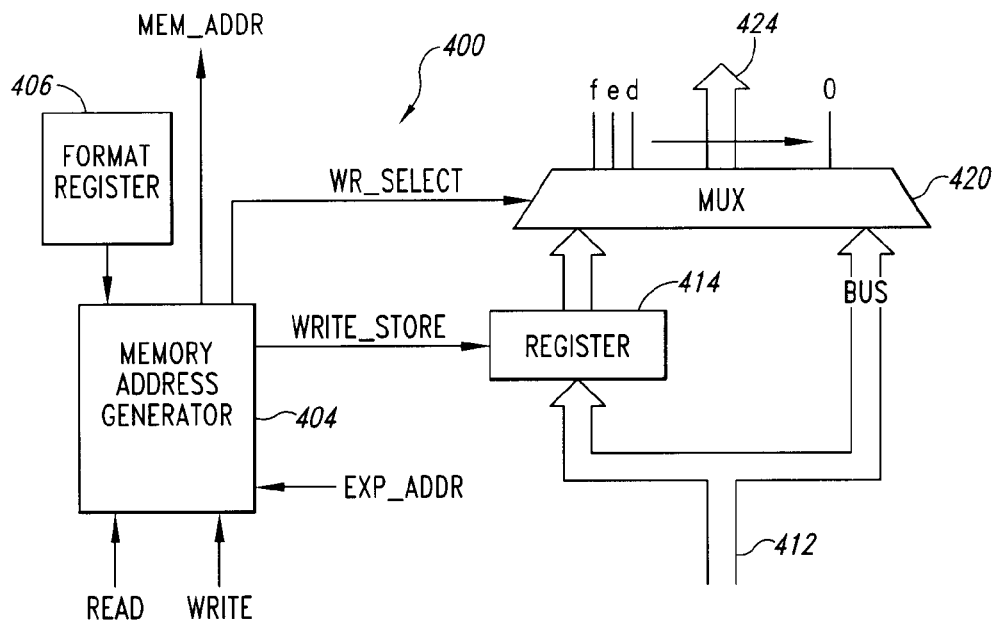
FIG. 4 is a block diagram of a portion of a write datapath for a memory controller according to an embodiment of the present invention.

FIG. 4 illustrates a portion of a write data path 400 for a memory controller that may be substituted into the memory controller 216 (FIG. 2). Write data is provided by the writing entity on a data input bus 412 to a register 414 and a multiplexer 420. A memory address generator 404 is coupled to the register 414 to provide a WRITE_STORE signal that activates the register 414 to save the write data presented to it on the data input bus 412. The memory address generator 404 is further coupled to the multiplexer 420 to provide it with a WR_SELECT signal that controls the multiplexer 420 to select particular bytes to store in the local memory 220 (FIG. 2) from the bytes presented by the data input bus 412 and the register 414. The selected data is provided to the local memory 220 over a memory write bus 424.

An example of a suitable multiplexer for the write data path 400 has the following programmability:

| mux sel | byte lane | | | | | | | | | | | | | | | |
|---|---|---|---|---|---|---|---|---|---|---|---|---|---|---|---|---|
| | f | e | d | c | b | a | 9 | 8 | 7 | 6 | 5 | 4 | 3 | 2 | 1 | 0 |
| 1 | x | x | x | x | x | x | x | x | x | x | x | x | Se | Sd | Sc | Sa |
| 2 | x | x | x | x | x | x | x | x | Se | Sd | Sc | Sa | S9 | S8 | S6 | S5 |
| 3 | x | x | x | x | Be | Bd | Bc | Ba | B9 | B8 | B6 | B5 | B4 | B2 | B1 | B0 |
| 4 | B4 | B2 | B1 | B0 | x | x | x | x | x | x | x | x | x | x | x | x |
| 6 | B9 | B8 | B6 | B5 | B4 | B2 | B1 | B0 | x | x | x | x | x | x | x | x |
| 7 | S9 | S8 | S6 | S5 | S4 | S2 | S1 | S0 | x | x | x | x | x | x | x | x |
| 8 | Be | Bd | Bc | Ba | B9 | B8 | B6 | B5 | B4 | B2 | B1 | B0 | x | x | x | x |
| 9 | B4 | B2 | B1 | B0 | Se | Sd | Sc | Sa | S9 | S8 | S6 | S5 | S4 | S2 | S1 | S0 |
| 10 | Be | Bd | Bc | Ba | B9 | B8 | B6 | B5 | B4 | B2 | B1 | B0 | Se | Sd | Sc | Sa |
| 12 | Se | Sd | Sc | Sa | S9 | S8 | S6 | S5 | S4 | S2 | S1 | S0 | Be | Bd | Bc | Ba |
| 14 | S4 | S2 | S1 | S0 | Be | Bd | Bc | Ba | B9 | B8 | B6 | B5 | B4 | B2 | B1 | B0 |
| 15 | Bf | Be | Bd | Bc | Bb | Ba | B9 | B8 | B7 | B6 | B5 | B4 | B3 | B2 | B1 | B0 | where Bn is byte n from the data input bus 412 and Sn is byte n from the register 414. The "x" represents byte lanes which are not enabled during the write command. That is, data is not written to memory for those byte locations indicated by an "x".

The operation of the write data 400 path illustrated in FIG. 4 is similar to that of the read data path 300 illustrated in FIG. 3. That is, in an unpacked data write, the line of data presented on the data input bus 412 is passed through the multiplexer 420 to the memory write bus 424. The local memory 220 stores the line of data at the location corresponding to the EXP_ADDR, which is provided by the memory address generator 404 to the local memory 220 as the MEM_ADDR. However, where there is a packed data write, data presented on the data input bus 412 and stored in the register 414 are rearranged and provided to the local memory 220 such that the bytes selected by the multiplexer 420 are stored in packed lines of data as previously described.

The operation of the write data path 400 will be illustrated by the following example. A write command is received by the memory address generator 404 to write a packed line of data into a location in memory having the first byte corresponding to byte "I". The line of data that is provided on the data input bus 412 will be 16 bytes or 4 words in length, and will have the format:

bytes [15:00]=lllllkkkkjjjjiiiI.

Upon receiving the line of data on the data input bus 412, the memory address generator 404 instructs the register 414 to store the line of data by providing it an active WRITE_STORE signal.

As discussed above, a packed line of data having a first byte at byte "I" will be stored across two lines of data, namely lines [1] and [2]. Moreover, the packing of data in the local memory 220 is transparent to the entity commanding the write operation, and consequently, the EXP_ADDR that is provided will be translated by the memory address generator 404 into a MEM_ADDR at which the data is actually stored. In the present example, the EXP_ADDR will be the eighth word, which corresponds to the first byte of line [2] of unpacked data. As a result, the memory address generator 404 provides a WR_SELECT signal to the multiplexer 420 that is equal to six, thus, according to the programmability table shown above, the bytes

| B9 | B8 | B6 | B5 | B4 | B2 | B1 | B0 | x | x | x | x | x | x | x | x |
|----|----|----|----|----|----|----|----|---|---|---|---|---|---|---|---|
| k  | k  | j  | j  | j  | i  | i  | I  | — | — | — | — | — | — | — | — | are written into the local memory 220 at the translated memory address, that is, into line [1]. As mentioned previously, data is not written to the local memory 220 for the byte lanes represented by the "x", thus, the data already written to those byte locations remain undisturbed. A second data write is made to the local memory 220 in order to store the remainder of the line of data provided on the data input bus 412. The memory address generator provides a one as the WR_SELECT signal to the multiplexer 420 in order to complete writing the line of data. Where the WR_SELECT signal is one, the bytes

| x | x | x | x | x | x | x | x | x | x | x | x | Se | Sd | Sc | Sa |
|---|---|---|---|---|---|---|---|---|---|---|---|----|----|----|----|
| — | — | — | — | — | — | — | — | — | — | — | — | 1  | 1  | 1  | k  | are written into the location corresponding to line [2]. The data written to memory locations corresponding to the byte lanes indicated by an "x" are left undisturbed. The resulting packed line of data appears in the local memory 220 as previously described. Namely, Line [1], bytes [31:16]=kkjjjiiIxxxxxxxx
Line [2], bytes [47:32]=xxxxxxxxxxxxlllk.

Figure 5:
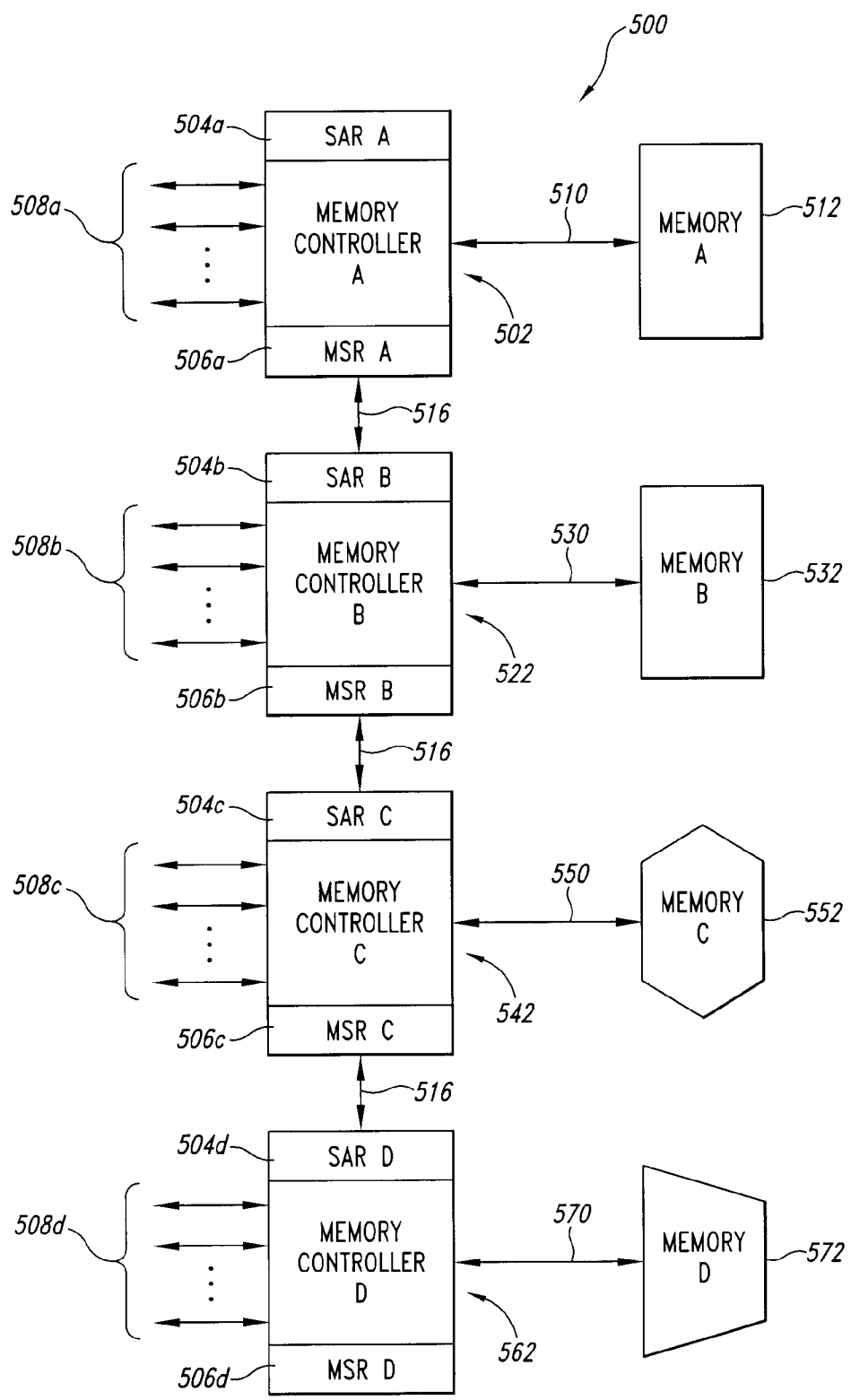
FIG. 5 is a block diagram of a distributed memory system in which an embodiment of the present invention may be implements.

Illustrated in FIG. 5 is a memory system 500 having a distributed memory controller in which embodiments of the present invention may be implemented. A more detailed description of the memory system 500 may be found in co-pending U.S. patent application Ser. No. 09/603,158 to Radke et al., entitled APPARATUS AND METHOD FOR DISTRIBUTED MEMORY CONTROL IN A GRAPHICS PROCESSING SYSTEM, filed on Jun. 23, 2000, which is incorporated herein by reference.

In summary, the memory system 500 includes separate memory controllers 502, 522, 542, and 562. Each of the memory controllers 502, 522, 542, and 562 controls and accesses a respective memory 512, 532, 552, and 572 through a memory bus that couples the memory controller to a respective memory. The memory controllers 502, 522, 542, and 562 are also coupled to each other through a memory controller bus 516. Memory access requests, as well as data, may be transferred through the memory controller bus 516 from one memory controller to another.

Each of the memory controllers 502, 522, 542, and 562 is also coupled to a set of memory access request lines 508a–d on which the respective memory controller directly receives memory access requests. A memory controller receives direct memory access requests from those requesting entities coupled to its particular request lines. For example, the memory controller 502 will receive direct memory access requests over the memory access request lines 508a. In contrast to a direct memory access request, an indirect memory access requests can be made by one memory controller to another through the memory controller bus 516 if the requested address is not in the addressable memory area of the memory to which the memory controller receiving the direct memory access request is coupled.

Included in each memory controller 502, 522, 542, and 562 are a respective start address register (SAR) 504a–d and a respective memory size register 506a–d (MSR). With respect to the memory controller 502, the SAR 504a stores the start address of the addressable memory area of the memory 512, and the MSR 506a stores the size or the amount of available addressable memory area of the memory 512. Similarly, the remaining SARs 504b–d and MSRs 506b–d store the respective start addresses and sizes of the addressable memory area for the memory to which the memory controller is coupled.

The values stored in the SARs and MSRs of the memory controllers may be programmed by an graphics application executing on the host processor 104 (FIG. 1). The graphics application may update the values stored in the SARs and MSRs during execution in order to reallocate the addressable memory area. By storing the start address and size for the addressable area which each memory controller 502, 522, 542, and 562 controls, a memory controller can determine whether the requested address is within the range of the memory to which it is coupled, or whether a direct memory access request should be passed to another memory controller as an indirect memory request.

The memory system 500 may be adapted to implement embodiments of the present invention by including in each of the memory controllers 502, 522, 542, and 562 the read datapath and write datapath illustrated in FIGS. 3 and 4, respectively. In this way, each of the memory controllers has the capability to read and write data in either a packed or unpacked format. The format register 306 (FIG. 3) may be a stand alone register or integrated into either the SAR or MSR of the respective memory controller. Operation of the memory system 500 will be similar to that described above. Details on implementing embodiments of the present invention in the memory system 500 are well within the ability of a person of ordinary skill in the art, and consequently, have been omitted herein.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for storing and accessing graphics data in a memory, comprising:
   storing in the memory graphics data in either a first data format having m-bits or a second data format having n-bits;
   retrieving graphics data from the memory in either the first or second data formats and providing the retrieved graphics data as m-bits in length, in response to retrieving graphics data in a second format, translating an expected address from which the graphics data is retrieved to a memory address at which the graphics data is actually retrieved and calculating a fractional remainder from the expected address using the equation: (expected address÷4)×3.

2. The method of claim 1 wherein the graphics data in the first data format is stored in a first region of the memory and the graphics data in the second data format is stored in a second region of the memory that is contiguous with the first region.

3. The method of claim 1 wherein m equals 32.

4. The method of claim 1 wherein n equals 24.

5. The method of claim 4, further comprising concatenating an 8-bit null value to the graphics data upon retrieving the graphics data stored in the second data formats.

6. The method of claim 4 wherein storing graphics data in the second data format comprises truncating the graphics data by 8 bits.

7. The method of claim 1 wherein storing graphics data comprises storing the graphics data in lines of memory 128-bits in length.

8. The method of claim 7 wherein retrieving graphics data comprises retrieving the graphics data in lines 128-bits in length.

9. A method for storing and accessing graphics data at an expected memory address in a memory, the method comprising:

storing graphics data m-bits in length in either first or second data formats in the memory in accordance with a programmable format flag, the graphics data stored in lines of memory 128-bits in length; and retrieving the graphics data from two lines of memory in either the first or second data formats and providing the retrieved graphics data as m-bits in length;

if retrieving graphics data in the second data format, inserting four 8-bit null values every 24 bits of the selected graphics data, beginning with the least significant bit;

selecting 96 bits from the retrieved graphics data; and calculating from the expected memory address a fractional remainder according, to which the 96 bits of graphics data are selected using the equation: (expected address÷4)×3.

10. The method of claim 9 wherein the first data format comprises 32-bit words.

11. The method of claim 9 wherein the second format comprises 24-bit words.

* * * * *

UNITED STATES PATENT AND TRADEMARK OFFICE
CERTIFICATE OF CORRECTION

PATENT NO. : 6,734,865 B1
DATED : May 11, 2004
INVENTOR(S) : Peterson et al.

It is certified that error appears in the above-identified patent and that said Letters Patent is hereby corrected as shown below:

Title page,
Item [*] Notice, delete the phrase "by 383 days" and insert -- by 430 days --

Signed and Sealed this

Nineteenth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,734,865 B1
DATED : May 11, 2004
INVENTOR(S) : James R. Peterson and William Radke It is certified that error appears in the above-identified patent and that said Letters Patent is hereby corrected as shown below:

Column 2,
Line 54, reads "implements." should read -- implemented. --

Column 3,
Line 13, reads "allow an operator or an" should read -- allow an operator of an --

Column 5,
Line 38, reads "into the upper most" should read -- into the uppermost --

Column 9,
Line 67, reads "memory access requests" should read -- memory access request --

Column 10,
Line 17, reads "by an graphics application" should read -- by a graphics application --

Column 12,
Line 12, reads "according, to which" should read -- according to which --

Signed and Sealed this

Eighteenth Day of January, 2005

JON W. DUDAS
*Director of the United States Patent and Trademark Office*